United States Patent
Narain et al.

(10) Patent No.: US 10,574,525 B2
(45) Date of Patent: Feb. 25, 2020

(54) CONFIGURATION AGREEMENT PROTOCOL METHOD

(71) Applicant: Vencore Labs, Inc., Basking Ridge, NJ (US)

(72) Inventors: Sanjai Narain, Basking Ridge, NJ (US); Brian Coan, Basking Ridge, NJ (US); Jon Kirsch, Basking Ridge, NJ (US)

(73) Assignee: Perspecta Labs Inc., Basking Ridge, NJ (US)

( * ) Notice: Subject to any disclaimer, the term of this patent is extended or adjusted under 35 U.S.C. 154(b) by 725 days.

(21) Appl. No.: 15/199,212

(22) Filed: Jun. 30, 2016

(65) Prior Publication Data
US 2017/0005870 A1   Jan. 5, 2017

Related U.S. Application Data

(60) Provisional application No. 62/188,354, filed on Jul. 2, 2015.

(51) Int. Cl.
*H04L 12/24* (2006.01)
*H04L 29/06* (2006.01)
(Continued)

(52) U.S. Cl.
CPC ........ *H04L 41/0893* (2013.01); *H04L 12/403* (2013.01); *H04L 41/0813* (2013.01);
(Continued)

(58) Field of Classification Search
CPC . H04L 41/0893; H04L 41/0813; H04L 67/10; H04L 41/0823; H04L 41/0873; H04L 63/20

See application file for complete search history.

(56) References Cited

U.S. PATENT DOCUMENTS

2005/0138517 A1*  6/2005  Monitzer ............ G06F 11/2025
                                                    714/746
2009/0265296 A1* 10/2009  Narain .................... G06N 5/02
                                                    706/47
(Continued)

OTHER PUBLICATIONS

Narain et al., Declarative Infrastructure Configuration Synthesis and Debugging, 2008, Journal of Network and Systems Management, Special Issue on Security Configuration, eds., p. 1-26 (Year: 2008).*

(Continued)

*Primary Examiner* — Tonia L Dollinger
*Assistant Examiner* — Joseph M Cousins
(74) *Attorney, Agent, or Firm* — Heslin Rothenberg Farley & Mesiti P.C.; Rachel L. Pearlman, Esq.

(57) ABSTRACT

A first controller in a distributed network obtains, concurrently with a second controller in the distributed network, a system requirement and a message from a logical bus. The first controller and the second controller are communicatively coupled to the logical bus, and the first controller is communicatively coupled to a first portion of the network components and the second controller is communicatively coupled to a second portion. A processor associated with the first controller solves, concurrently with the second controller, the system requirement and the solving includes applying a solver to generate new configurations of the network components. The new configurations generated by the first controller are identical to the new configurations generated by the second controller. The first controller extracts configurations relevant to the first portion of the network components and applies the configurations to the first portion of the network components.

14 Claims, 7 Drawing Sheets

(51) Int. Cl.
 H04L 12/403 (2006.01)
 H04L 29/08 (2006.01)
(52) U.S. Cl.
 CPC ...... *H04L 41/0823* (2013.01); *H04L 41/0873* (2013.01); *H04L 63/20* (2013.01); *H04L 67/10* (2013.01)

(56) References Cited

U.S. PATENT DOCUMENTS

| | | | | |
|---|---|---|---|---|
| 2011/0022373 A1* | 1/2011 | Baumgartner | ........ | G06F 17/504 703/13 |
| 2012/0331115 A1* | 12/2012 | Narain | ................ | H04L 41/0813 709/220 |
| 2013/0305199 A1* | 11/2013 | He | ...................... | G06F 17/5054 716/104 |
| 2016/0050125 A1* | 2/2016 | Mattson | .............. | H04L 41/5051 709/225 |
| 2016/0105316 A1* | 4/2016 | Guntaka | ............. | H04L 41/0823 370/254 |
| 2016/0127223 A1* | 5/2016 | Kern | ...................... | H04L 45/02 370/225 |

OTHER PUBLICATIONS

Vidal et al., A Prototype Implementation of a Distributed Satisfiability Modulo Theories Solver in the ToolBus Framework, Mar. 2008, J. Braz. Comp. Soc. vol. 14 No. 1, p. 1-16 (Year: 2008).*

* cited by examiner

400

410

One or more programs executed at each controller obtain a system requirement from a common bus and solve the system requirement in the context of a current dynamic state.

420

One or more programs at each controller apply configurations relevant to each controller's enclave to its enclave's components, causing the network to converge to a new configuration satisfying the system requirement.

FIG. 4

CONFIGURATION AGREEMENT PROTOCOL METHOD

CROSS-REFERENCE TO RELATED APPLICATIONS

This application claims priority to U.S. Provisional Application No. 62/188,354 filed Jul. 2, 2015, entitled, "HYBRID SDN/LEGACY POLICY ENFORCEMENT AND CONFIGURATION AGREEMENT PROTOCOL" which is incorporated herein by reference in its entirety.

STATEMENT REGARDING FEDERALLY SPONSORED RESEARCH OR DEVELOPMENT

This invention was made with government support under contract number FA8750-13-C-0030 awarded by the U.S. Air Force Research Laboratory of U.S. Department of Defense. The government has certain rights in the invention.

FIELD OF INVENTION

The invention relates generally to systems and methods that increase network efficiency specifically related to ease, speed, and accuracy of configuration and reconfiguration of networks.

BACKGROUND OF INVENTION

In complex networks, often, there is no central authority that has control over all network components. Instead, the network is partitioned into multiple administrative domains. Yet, global configuration consistency has to be enforced so that end-to-end services e.g., for collaboration, can be set up.

SUMMARY OF INVENTION

Shortcomings of the prior art are also overcome and additional advantages are provided through the provision of a method to implement changes to a network in accordance with a configuration agreement protocol. In an embodiment of the present invention, decentralization of network control while maintaining consistency is accomplished by utilization of this protocol based on the total ordering guarantees of group communication protocols (e.g., such as Jgroups), and the determinism of solvers (e.g., Simultaneous Multi-Threading, SMT, and Propositional Satisfiability Problem, SAT, solvers). A challenge of in-band configuration is maintaining the invariant that the controller does not lose connectivity to a node before it has reconfigured it. In an embodiment of the present invention, this invariant is encoded as a constraint on current and final static routes and solved by a SAT or SMT solver to compute a safe reconfiguration order. In an embodiment of the present invention, if only dynamic routing is used then no constraint solver is used. In an embodiment of the present invention, the reconfiguration order is computed from a reverse breadth-first search traversal of the network as a tree with the controller as root.

Shortcomings of the prior art are also overcome and additional advantages are provided through the provision of a method to implement changes to a network in accordance with a configuration agreement protocol. The method includes: obtaining, by one or more processors of a first controller in a distributed network comprised of network components, concurrently with a second controller in the distributed network, a system requirement and a message from a logical bus, wherein the first controller and the second controller are communicatively coupled to the logical bus, and wherein the first controller is communicatively coupled to a first portion of the network components and the second controller is communicatively coupled to a second portion of the network components; based on the message, solving, by the one or more processors of the first controller, concurrently with the second controller, the system requirement in a context of a current dynamic state of the network components, wherein the solving comprises applying a solver to generate new configurations of the network components, wherein the new configurations generated by the first controller are identical to the new configurations generated by the second controller; and extracting, by the one or more processors of the first controller, configurations relevant to the first portion of the network components; and applying, by the one or more processors of the first controller, the configurations to the first portion of the network components.

Systems and methods relating to one or more aspects of the technique are also described and may be claimed herein. Further, services relating to one or more aspects of the technique are also described and may be claimed herein.

Additional features are realized through the techniques of the present invention. Other embodiments and aspects of the invention are described in detail herein and are considered a part of the claimed invention.

BRIEF DESCRIPTION OF DRAWINGS

One or more aspects of the present invention are particularly pointed out and distinctly claimed as examples in the claims at the conclusion of the specification. The foregoing and objects, features, and advantages of one or more aspects of the invention are apparent from the following detailed description taken in conjunction with the accompanying drawing.

FIG. 4 is a workflow illustrating certain aspects of an embodiment of the present invention.

DETAILED DESCRIPTION OF THE INVENTION

Aspects of the present invention and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the invention in detail. It should be understood, however, that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure. The terms software and program code are used interchangeably throughout this application.

Figure 1:
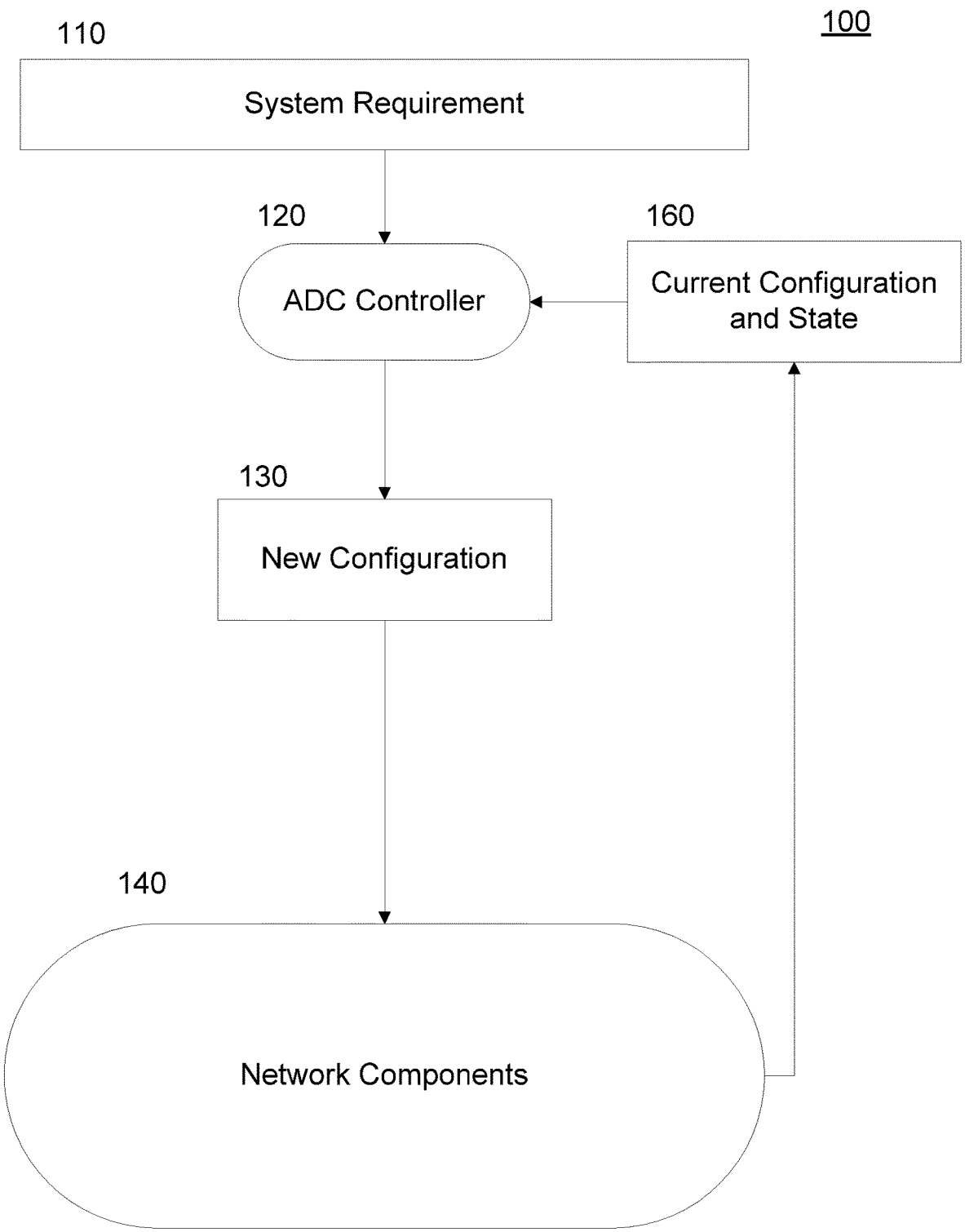
FIG. 1 is an example of a standard technical architecture where a centralized controller imparts configurations on components.

Configuration errors account for 50% to 80% of downtime and vulnerabilities. An Assured and Dynamic Configuration (ADC) system, as depicted in FIG. 1, offers a set of fundamental tools to help eliminate such errors. As seen in FIG. 1, a controller (ADC controller) 120 obtains a system requirement 110. Based on the system requirement, the program code at the controller 120 generates a new configuration 130 and implements the new configuration 130 in the components 140 of the network 100. Upon implementation of the new configuration 130, the program code at the controller 120 receives the current configuration and state 160 (the network components' 140 post-configuration states).

These tools utilized by the ADC controller 120, comprised in the program code that it executes and/or libraries accessed by the program code, are for requirement specification, configuration synthesis, diagnosis, repair, verification, moving-target defense and symbolic reachability analysis. The tools exploit the power of modern SAT and SMT solvers. ADC's specification language contains fundamental logical structures and relationships associated with different protocols. It formalizes the idea that network security and functionality requirements as specified, for example, in architecture diagrams, can be regarded as a superposition of such logical structures and relationships. These are modeled as constraints on configuration variables within and across components. Superposition is accomplished with Boolean operators. In an ADC controller 120, the program code uses an SAT and/or SMT solver to solve requirements to compute values of configuration variables satisfying all requirements. In contrast, traditional configuration languages require one to specify the value of every configuration variable, in effect, forcing one to manually solve the constraint satisfaction problem.

ADC assumes full-featured routers, not just those that do forwarding and access-control. Thus, ADC does not require one to reimplement the well engineered routing, security and performance management protocols available in modern routers. For example, cryptographic separation of multiple fault-tolerant virtual private networks can be accomplished by configuring Internet Protocol Security (IPsec), Generic Routing Encapsulation (GRE), Routing Information Protocol (RIP), and Open Shortest Path First (OSPF). However, an ADC system assumes a global controller 120 at which one can design and generate the configuration for the network as a whole. It also assumes an out-of-band network over which the controller monitors the current configurations and downloads new ones to components. In many networks, such as hybrid networks, centralized control cannot be assumed and out-of-band configuration methods can add too much overhead to be feasible.

In many networks, including hybrid networks, there is often no central authority that has control over all network components. For example, in some existing networks, the network is partitioned into multiple administrative domains. Yet, global configuration consistency has to be enforced so that end-to-end services e.g., for collaboration, can be set up. Configuration-Agreement Protocol (CAP) methods can be utilized, including in a DADC system, to allow controllers in each domain of a complex network to exchange messages and enforce global consistency in accordance with embodiments of the present invention.

Figure 2:
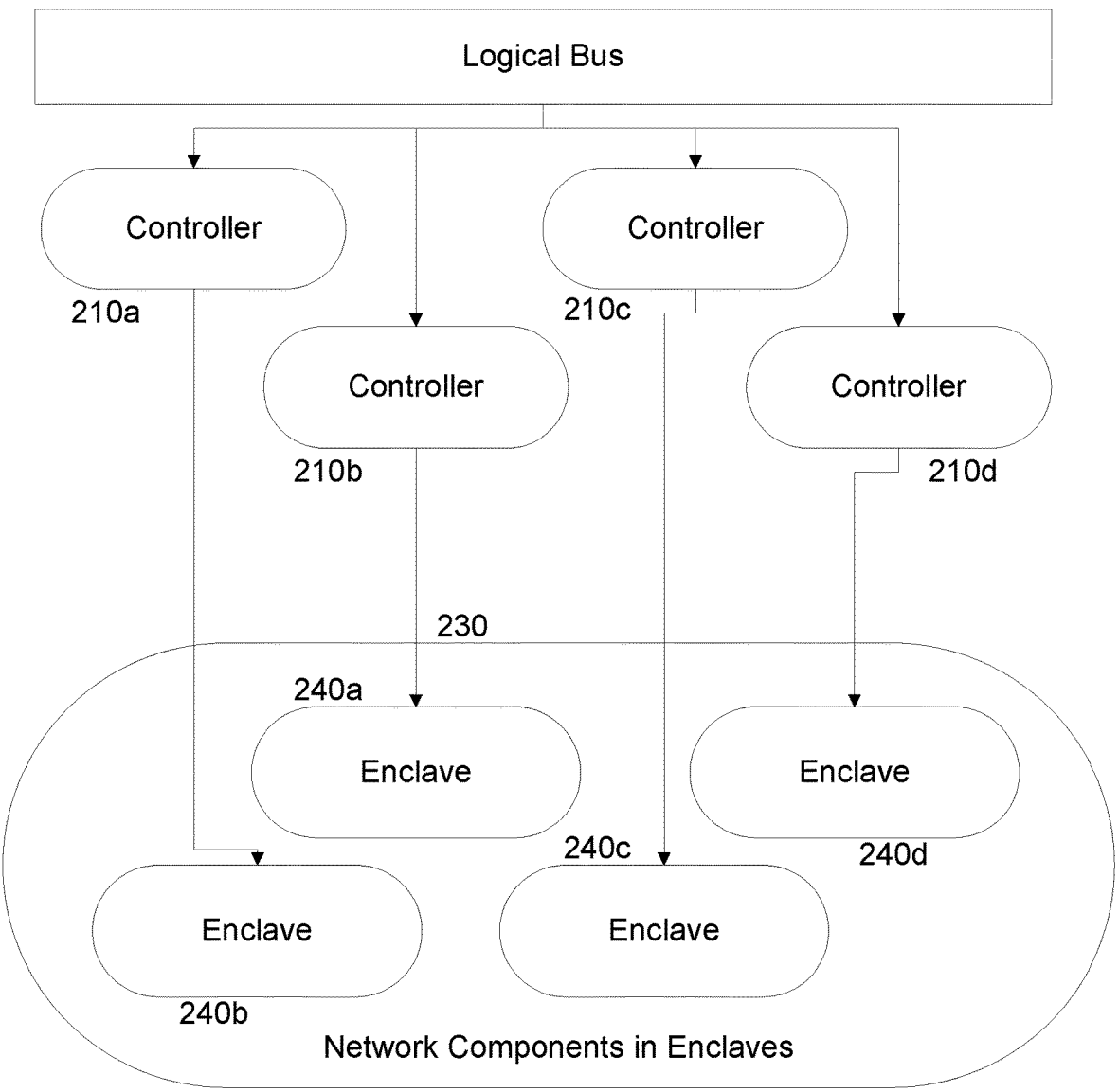
FIG. 2 is an example of a technical architecture utilized by some embodiments of the present invention.

In an embodiment of the present invention, when utilizing CAP methods, each controller is assigned to a different network enclave with a distinct set of network components. A technical architecture into which aspects of embodiments of the present invention may be implemented is illustrated in FIG. 2. FIG. 2 is an example of a distributed architecture utilized by some embodiments of the present invention. Distributed architecture may include complex systems, including but not limited to, cloud computing systems.

In an embodiment of the present invention, as seen in FIG. 2, components of a hybrid network 230 are partitioned into enclaves 240a-240d, each with a separate controller 210a-210d. Each controller 210a-210d, which may be a Distributed Assured and Dynamic Configuration (DADC) controller, obtains security and functionality requirements from a logical bus 212. In an embodiment of the present invention, the controllers solve dependencies between dynamic state and configurations, generate new configurations, and apply to components in their enclaves. In an embodiment of the present invention, controller action consistency is ensured by total-ordering of group communication protocols, and determinism of SAT/SMT (Boolean Satisfiability Problem/Satisfiability Modulo Theories) solvers. Consistency is maintained between the controllers as, in an embodiment of the present invention, they execute the configurations in the same order such to keep the components in all enclaves in sync and accessible to each other.

FIG. 2 is one example of how enclaves may be assigned to individual controllers and aspects of the present invention may be implemented into this technical environment. However, embodiments of the present invention may be implemented in technical environments that utilize multiple controllers in differing configurations, for example, each controller may be assigned to multiple enclaves, each with a distinct set of network components, as seen in FIG. 2, or each controller may be assigned to a single enclave, where any two enclaves may or may not have overlapping sets of network components, or each controller is may be assigned to multiple enclaves, where any two enclaves may or may not have overlapping sets of network components.

In an embodiment of the present invention (referred to herein as a CAP method), program code executing on a controller configures all network components in its enclave(s), thus resulting in multiple configuration operations for the same network component. To avoid global configuration inconsistencies, the program code generates the configurations by utilizing deterministic (or probabilistic with shared randomness) SAT or SMT solvers. This consistency is advantageous in environments where redundancy is required (for instance, when there is a chance that a controller may be faulty or stop working for any reason).

In an embodiment of the present invention, the program code utilizes SAT or SMT solvers because the determinism of these solvers achieves consistency of the configuration actions taken by the multiple controllers. As illustrated in FIG. 2, in an embodiment of the present invention, program code in all controllers 210a-210d run the same solver to solve dependencies between dynamic state and configurations, generate new configurations, and apply them to components in their enclaves. Because this solver is deterministic, all controllers 210a-210d derive the same new global configurations and each controller 210a-210d applies a local configuration to the network components in its enclave 240a-240d that is consistent with all others controllers 210a-210d, and, therefore, globally consistent over the network 230.

In an embodiment of the present invention, program code may apply probabilistic SAT or SMT solvers (instead of deterministic solvers) and maintain the global consistency as long as the program code in each controller 210a-210d obtains the same sequence of random bits used by the probabilistic SAT or SMT solver. By obtaining the same bits, the program code in each controller 210a-210d executes the probabilistic SAT or SMT solver and generates the same output, since each execution uses the same sequence of random bits.

Returning to FIG. 1, the Distributed ADC (DADC) system removes the assumptions of a centralized controller and out-of-band control network. Decentralization is accomplished by Configuration-Agreement Protocol (CAP) based on the total ordering guarantees of group communication protocols such as JGroups, and the determinism of SAT and SMT solvers. A challenge of in-band configuration is maintaining the invariant that the controller does not lose connectivity to a node before it has reconfigured it. In an embodiment of the present invention, this invariant is encoded as a constraint on current and final static routes and solved by a SAT or SMT solver to compute a safe reconfiguration order. In an embodiment of the present invention, If only dynamic routing is used then no constraint solver is used. The reconfiguration order is computed from a reverse breadth-first search traversal of the network as a tree with the controller as root.

Embodiments of the present invention provide reliable message delivery, total order of message delivery (all correctly operating controllers get the same messages in the same order), and extended virtual synchrony, meaning that notification of controller failures or recovery is provided as a system-generated message ordered with respect to the ordinary controller-generated messages. The benefit of totally ordering the messages in an embodiment of the present invention is that all of the users have a consistent view of the order of events in the distributed system. This ordering eliminates much of the complexity of asynchrony in a distributed system because each participant knows that its view of the order in which things happen is shared by the other participants.

Figure 3:
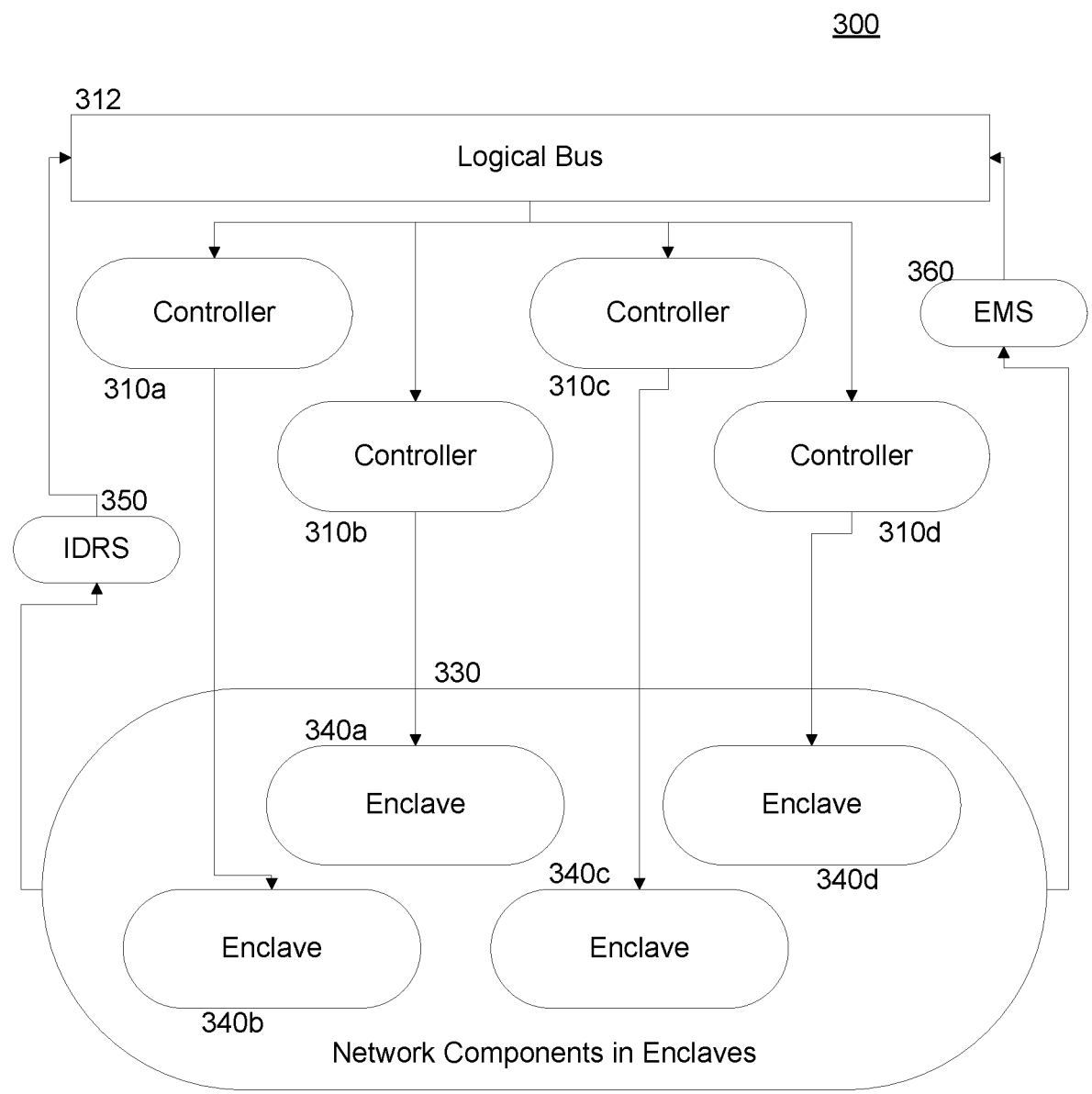
FIG. 3 is an example of a technical architecture utilized by some embodiments of the present invention.

FIG. 3 illustrates a technical environments utilizing aspects of an embodiment of the present invention with certain components similar to those in FIG. 2 with the addition of mechanisms for obtaining additional information by the bus 312 (FIG. 3). As seen in FIG. 3, by communicating between the various controllers 310a-310d utilizing the bus 312, the program code carries up/down status information about network components, provided by the EMS 360, intrusion detection alerts, provided by the IDRS 350, changes in group membership (provided by the group communication service, itself), state transfers to integrate a controller that joins late or has crashed and recovered, and controller initiated messages. Although not every input change communicated by the program code triggers a new configuration, all controllers 310a-310d gain a common understanding of which messages on the message bus 312 trigger a reconfiguration (i.e., a trigger message). Because of the total ordering, whenever a controller 310a-310d receives a trigger message via the bus 312, the program code in the controller 310a-310d obtains the same sequence of updates as any other controller 310a-310d that receives the same trigger message and will therefore, the program code in each controller 310a-310d will generate identical configurations. In order to synchronously implement the configuration changes to enclaves 340a-340b, the controllers 310a-310d, upon receiving trigger messages, may wait a given interval before implementing configuration changes, in order to account for any lag in other parts of the system.

In an embodiment of the present invention, the program code guards the synchronization of the various controllers by providing state synchronization for controllers that are late joining or have been down for a long time, coordinating of the time for beginning of a configuration change (as explained above), and implementing a recovery in the event that the network is disconnected.

Returning to FIG. 3, as discussed earlier, the set of network components is partitioned into enclaves 340a-340d each controlled by a controller 310a-310d, referred to herein as a DADC controller. Each controller 310a-310d has the full functionality of a centralized ADC server. The individual controllers may communicate with each other over a logical bus 312, which in this embodiment of the present invention, is a CAP bus. Enterprise Management Systems (EMS) 360 (FIG. 3) and Intrusion Detection and Response Systems (IDRS) 350 (FIG. 3) that provide information about the dynamic state of components, e.g., up, down, and/or compromised may also communicate with the controllers 310a-310d by utilizing the bus 312.

In an embodiment of the present invention, the program code (in accordance with CAP methods) guarantees that messages are delivered to all controllers in the same order. Therefore it presents to each controller an identical view of the dynamic state of all components. Thus, each controller 210a-210d also has the identical system requirement(s) governing the whole network.

FIG. 4 illustrates a workflow 400 of an embodiment of the present invention. As illustrated in FIG. 4, upon receipt of a message related to a system requirement, program code executed at each controller solves the system requirement in the context of a current dynamic state (410). As aforementioned, the SAT and/or SMT solvers used are deterministic. Thus, each controller arrives at identical conclusions about the new configurations of all components, not just its own. Program code at each controller applies configurations relevant to its enclave to its enclave components, causing the entire network to converge to a new configuration satisfying the system requirement (420).

In an embodiment of the present invention, utilization of a CAP method bus provides control plane resiliency that enables the work of DADC to continue uninterrupted even if some of the federated controllers crash. As aforementioned, the network is divided into enclaves, each with one or more controllers. In each enclave, one controller is the primary and the rest are backups. The program code ensures that a backup controller can take over seamlessly if the primary fails.

In an embodiment of the present invention, primary and backup controllers participate in the CAP method, which elects one controller per enclave as primary. If the primary fails, the program code selects a backup to take over the job of the primary. Because the backup has been receiving and processing messages, it has all of the information that it needs to immediately take over for the primary.

Returning to FIG. 2, in an embodiment of the present invention, the controllers 210a-210d, communicate with each other over the same network that they are reconfiguring. In other words, the CAP logical bus 212 is "in-band." As aforementioned, in an embodiment of the present invention, the different types of messages may appear on the CAP bus, including but not limited to, the following:

Type 0—Specification: This message indicates a request to implement a specification.

Type 1—Moving-Target Defense Request: This message indicates a request to change critical variable values.

Type 2—Data-Plane Update: This message indicates change in dynamic state of a system component.

Type 3—Control-Plane Update: This message indicates change in the dynamic state of a DADC controller.

Type 4—State Synch: This message is sent to a controller that has newly joined or has changed its state to working. It makes the controller aware of the dynamic state of all control and data plane components as well as recent values of all critical variables.

Figure 5:
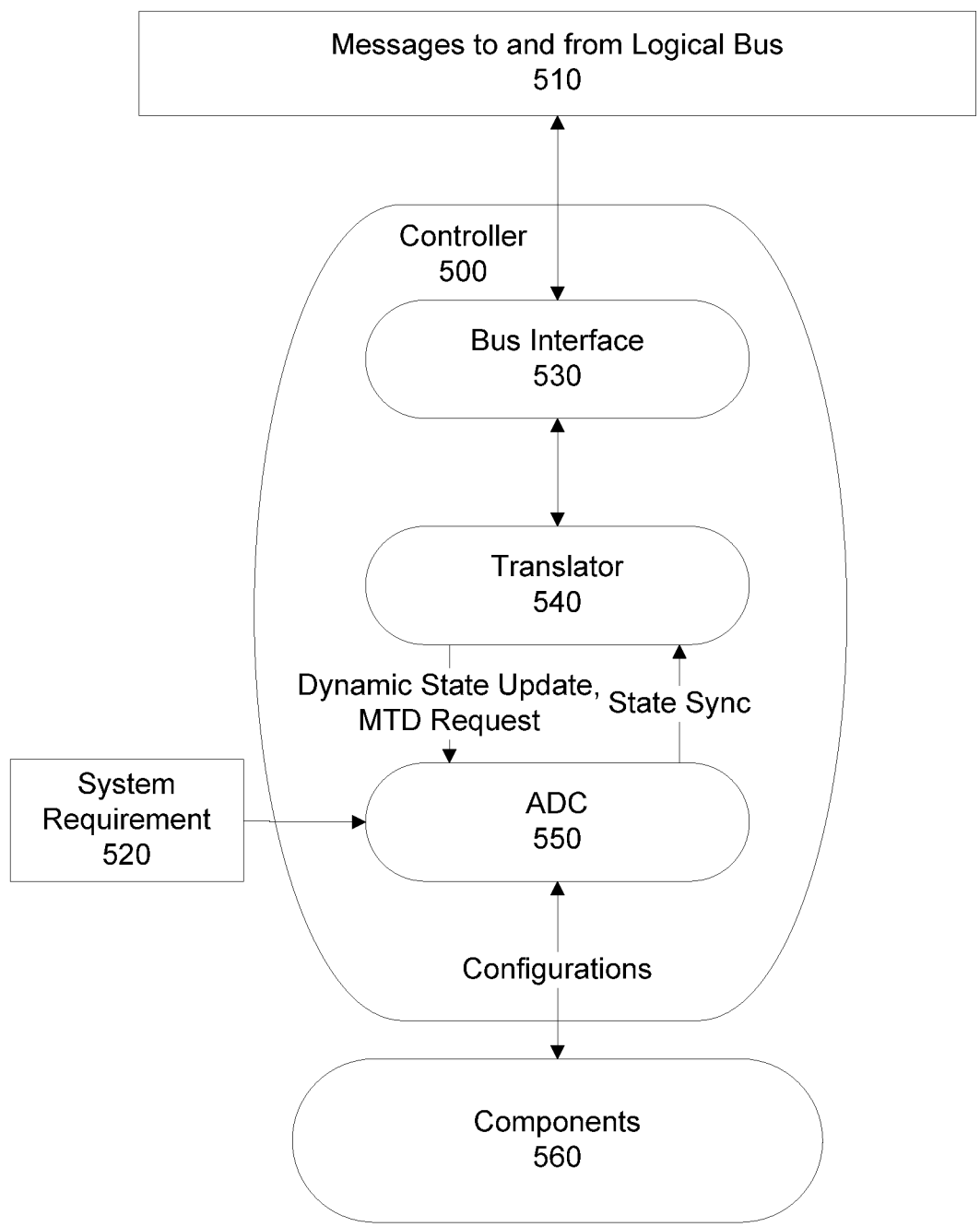
FIG. 5 is an example of the architecture of a controller in an embodiment of the present invention.

FIG. 5 is an example of the architecture of a controller 500 in an embodiment of the present invention. As aforementioned, each controller 500 in a DADC system obtains messages (e.g., configuration messages) from a logical bus (e.g., a CAP bus) 510. For ease of understanding, the functionality of the controller 500 is described as utilizing various program code modules. However, the separation of functionality is merely provided for illustrative purposes and as understood by one of skill in the art, can be implemented as one or more programs in a variety of different ways. In an embodiment of the present invention, when a controller obtains a message of Type 1 through the (e.g., CAP) bus interface module 530, the Translator module 540 computes the current dynamic state of all components as a constraint, and strengthens it with the constraint that critical variable values be different from their recent ones. The Translator 540 sends the resulting constraint to the ADC module 550, which forms the conjunction of this constraint with System Requirement 520 and solves it. ADC then extracts configurations relevant to its enclave components and applies these to the components 560 of the network, which may include routers.

In an embodiment of the present invention, when a controller receives a Type 2 message, its behavior is identical to that in the previous case except that critical variable values are not required to change. This response accomplishes resilience to data plane failure or compromise and when System Requirement encodes reachability constraints, also reconfiguration out of a line of fire.

In an embodiment of the present invention, when a controller receives a Type 3 message indicating that some other controller is failed or compromised, its action depends on whether it is in the same enclave as the failed controller. If the recipient is in the same enclave it determines if it is the new primary. If so, it takes over for the old primary, if not it takes no special action and remains a backup. If the recipient is in a different enclave, it determines if there is still an operating controller in the enclave where the failure occurred. If so, it takes no action. If instead the last controller in that enclave has failed the recipient remembers that when it next computes the dynamic state of components within the failed controller's enclave, it marks their state as inviolate. This means that any solution that the constraint solver produces must not change the current configurations of these components. The assumption is that since all of their controllers are down, there is no agent to change their configurations.

In an embodiment of the present invention, when a controller receives a Type 3 message indicating that the failed controller is back to working state or a new controller has just joined, then a controller chosen by CAP publishes a Type 4 message to bring the rejoining controller up to date with the current dynamic state and recent values of critical variables. The next time the rejoining controller receives a Type 1 or 2 message, it recomputes a configuration that is identical to that computed by all other controllers. These responses accomplish resilience to control-plane failure or compromise.

The following is more detailed information regarding specific examples of the various message types described earlier that are utilized in embodiments of the present invention to configure and synchronize network components in a decentralized network. First, Table 1 and Table 2, provided below, contains some general information about various message types. After the tables, more detailed explanations, including specific implementation examples, are given.

TABLE 1

| Message type | Implementation | Sender | Receiver that acts on message | Receiver action |
| --- | --- | --- | --- | --- |
| Type 0: New specification | MT_SPEC_FILE | Any controller | All controllers | runSpec( ) pushConfigs( ) |
| Type 1: Moving-target defense Request | MT_MTD | Any controller | All controllers | runMTD( ) |
| Type 2: Data-plane update | MT_DATA_PLANE_UPDATE | IDRS, EMS | All controllers | dataPlaneUpdate( ) |
| Type 3: Control-plane update | JGroups callback containing the current list of active members | JGroups infrastructure | All CAP participants | controlPlaneUpdate( ) |
| Type 4: State synchronization request | JGroups call and callbacks for state synchronization | Any CAP participant | Any CAP participant | getState( ) setState( ) |

MT_DATA_PLANE_UPDATE messages carry status updates about controllers and network elements. Table 2 describes these messages in more detail.

TABLE 2

MT_DATA_PLANE_UPDATE message information.

| Data plane message parameters | Purpose | Sender | Receiver | Receiver action |
| --- | --- | --- | --- | --- |
| Host ID, IDRS status | Notification that a component is compromised, suspicious or good | IDRS | All controllers | Updates compromised component list |

TABLE 2-continued

MT_DATA_PLANE_UPDATE message information.

| Data plane message parameters | Purpose | Sender | Receiver | Receiver action |
|---|---|---|---|---|
| Host ID, EMS status | Notification that a component is up or down | EMS | All controllers | Updates operational component list |

In an embodiment of the present invention, the CAP messages outlined in Table 1 are processed using the mechanisms discussed in earlier. DADC builds on the ADC code base, and introduces three new data types that are maintained by the controllers and updated in reaction to CAP messages: dead controllers: List of controllers that are down., down devices: List of routers or managed devices that are down, and compromised: List of network elements identified as compromised by the IDRS.

CAP Message Type 0

In an embodiment of the present invention, a user presents a new specification file to a controller. The controller then sends a message on the bus with the specification file. The message begins with the message type MT_SPEC_FILE and the contents of the specification file are appended. The controller then calls channel.send( ) which puts the message on the bus. When a controller receives the contents (through the handleMessage( )method), it runs the runSpec( )method to produce configurations and then runs pushConfigs( ) to configure the routers under its management.

The program code may perform additional processing to take into account controllers or network components that are down. The program code may suspend configuration changes for any variables related to controllers or managed devices that are reported on the dead controllers list and down devices lists. Thus, when the down devices come back up, they are able to continue to communicate on the network. To accomplish this, each controller performs the following steps:

1) The controller reads the dead controllers list to determine which controllers are in the down state. It then appends to the specification file lines of the form change cost <dead controller variable>=−1 for all controllers on the dead controllers list. For example, if controller-81 is on the dead controllers list, every controller will add the following lines to their copy of the specification file:

change cost ip address controller-81 tap81=−1 change cost component type controller-81=−1 change cost mask controller-81 tap81=−1 change cost next hop controller-81 0.0.0.0 0=−1

By convention-1 is used to represent an infinite cost of changing a variable. So, these lines add constraints that no configuration changes alter the values of the variables of controller-81.

2) The controller examines the specification file to determine all the network devices that are managed by the dead controller. It does this by looking for the DADC enclave directive in the specification file. For example, the line below in the specification file states that controller-81 manages the CoreSeattle and AccessSeattle routers: DADC enclave controller-81 CoreSeattle AccessSeattle. Therefore, the controllers will append to the specification file lines of the form change cost <device variable>=−1 for CoreSeattle and AccessSeattle. In this illustrative non-limiting example, this results in the following added lines:

change cost ip address CoreSeattle FastEthernet1/1=−1 change cost ip address AccessSeattle FastEthernet1/1=−1

These lines add constraints so that configuration changes are suspended for controller-81's managed devices.

3) Devices on the down devices list are handled in a similar manner. Controllers append to the specification file change cost <variable of device>=−1 for each device on the down device list. These lines add constraints so that configuration changes for these devices are suspended.

CAP Message Type 1

In an embodiment of the present invention, a user may requests a mobile network (MTD) of a controller. The controller then puts the MTD request on the bus. The message contains the message type MT_MTD. The controller then calls channel.send( ) which puts the message on the bus. When a controller receives the contents (e.g., through the handleMessage( )method), it runs runMTD( ) to produce configurations and then runs pushConfigs( ) to configure the routers under its management. In an embodiment of the present invention, MTD applies the same processing for handling controllers on the dead controllers list and devices on the down devices list as previously described for Type 0 message handling.

CAP Message Type 2

In an embodiment of the present invention, an EMS 360 or IDRS 350 (FIG. 3), detects an issue with a device. In an embodiment of the present invention, program code carries up/down status information about network components (provided by the EMS) and intrusion detection alerts (provided by the IDRS), and puts messages related to these issues on the bus 312 (FIG. 3). In an embodiment of the present invention, the message begins with the message type of MT_DATA_PLANE_UPDATE. The controller then calls channel.send( ) which puts the message on the bus. When a controller receives the contents (through the method handleMessage( ), it runs dataPlaneUpdate( ) to save the current state of the device in question. This updates the down devices list in the case of a downed device or the compromised devices list when a compromised device is reported. This information is used later by the program code to produce and deploy new configuration files.

CAP Message Type 3

In an embodiment of the present invention, when JGroups detects a change in membership, it announces this to all current group members by calling the viewAccepted( ) method as described earlier. This in turn calls jgroupsCtrlUpdate( ) which updates the current list of downed controllers.

CAP Message Type 4

In an embodiment of the present invention, type 4 messages are implemented by utilizing the built-in state synchronization feature of JGroups. Three parties are involved in this interaction: the initiating bus member, the JGroups infrastructure, and the bus member chosen by JGroups to send the current state to the initiating bus member. The protocol is outlined below.

1) While it is connecting to the bus, the initiating bus member requests the current state by calling the channel.connect( ) method. This method atomically joins the bus and obtains the current state.

2) This request causes JGroups to choose the oldest bus member to send the current state.

3) The chosen bus member's getState( ) callback method is then called. That bus member then packages up its current state information and passes it back to JGroups which forwards the package to the initiating bus member.

4) Once the initiating bus member receives the state, its setState( ) callback method is called, which unzips the bundle and uses it as the initial state of the initiating bus member.

Figure 6:
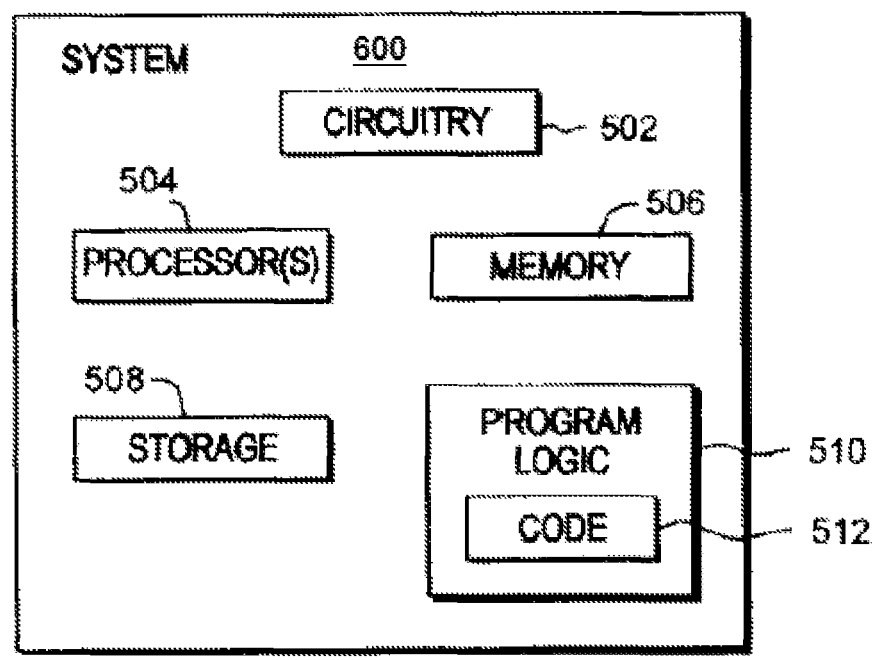
FIG. 6 depicts a computer system configured to perform an aspect of an embodiment of the present invention.
Figure 7:
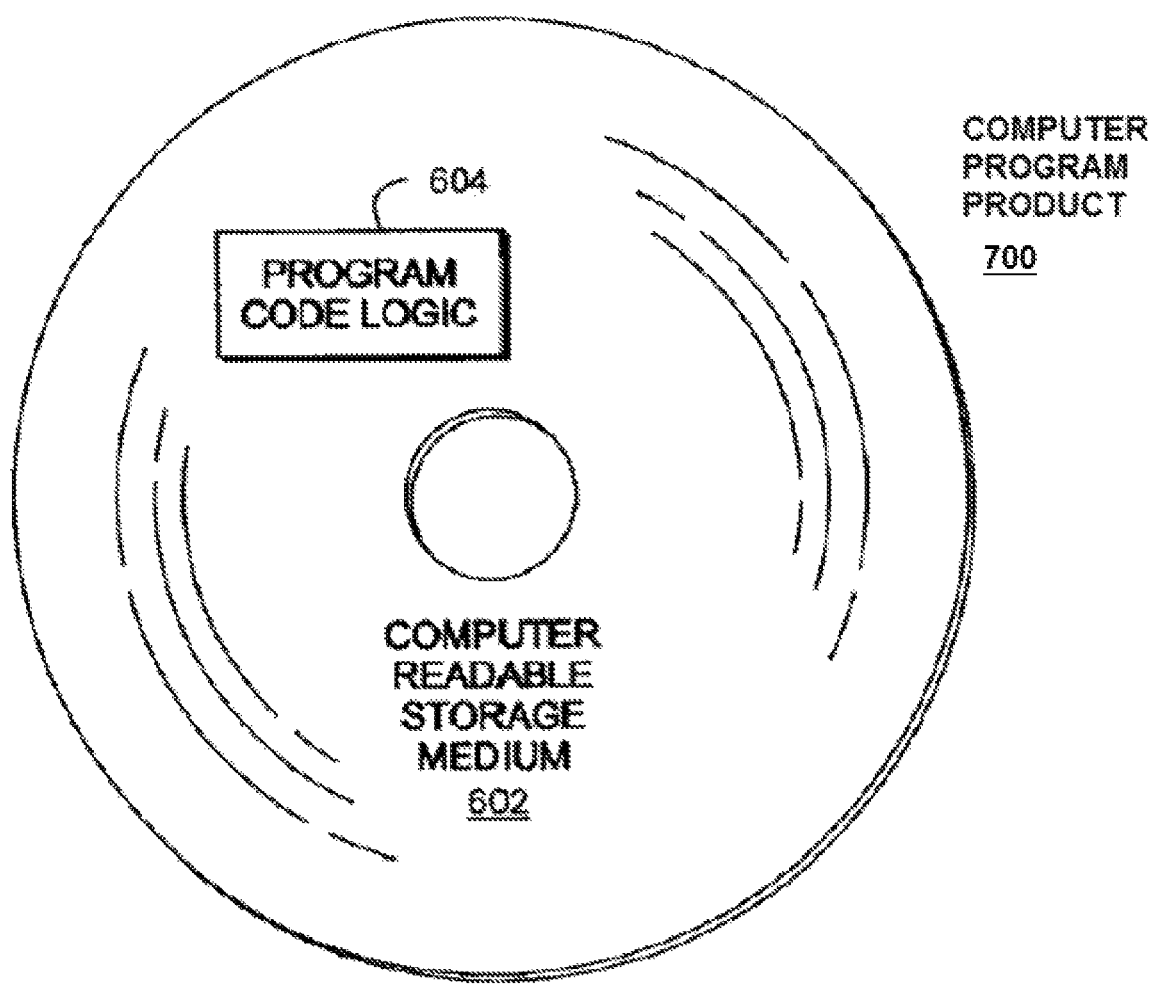
FIG. 7 depicts a computer program product incorporating one or more aspects of the present invention.

FIG. 6 and FIG. 7 are relevant to the nodes executing program code discussed in this disclosure, including the DADC controllers and the CAP bus. FIG. 6 illustrates a block diagram of a resource 600 in computer system, such as a controller. Returning to FIG. 6, the resource 600 may include a circuitry 502 that may in certain embodiments include a microprocessor 504. The computer system 600 may also include a memory 506 (e.g., a volatile memory device), and storage 508. The storage 508 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 508 may comprise an internal storage device, an attached storage device and/or a network accessible storage device. The system 600 may include a program logic 510 including code 512 that may be loaded into the memory 506 and executed by the microprocessor 504 or circuitry 502.

In certain embodiments, the program logic 510 including code 512 may be stored in the storage 508, or memory 506. In certain other embodiments, the program logic 510 may be implemented in the circuitry 502. Therefore, while FIG. 7 shows the program logic 510 separately from the other elements, the program logic 510 may be implemented in the memory 506 and/or the circuitry 502. The program logic 510 may include the program code discussed in this disclosure that facilitates the reconfiguration of elements of various computer networks, including those in various figures.

Using the processing resources of a resource 600 to execute software, computer-readable code or instructions, does not limit where this code can be stored. Referring to FIG. 7, in one example, a computer program product 600 includes, for instance, one or more non-transitory computer readable storage media 602 to store computer readable program code means or logic 604 thereon to provide and facilitate one or more aspects of the technique.

As will be appreciated by one skilled in the art, aspects of the technique may be embodied as a system, method or computer program product. Accordingly, aspects of the technique may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the technique may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the technique may be written in any combination of one or more programming languages, including an object oriented programming language, such as Java, Smalltalk, C++ or the like, and conventional procedural programming languages, such as the "C" programming language, PHP, ASP, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the technique are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions, also referred to as software and/or program code, may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the technique. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the technique may be provided, offered, deployed, managed, serviced, etc. by a service provider who offers management of customer environments. For instance, the service provider can create, maintain, support, etc. computer code and/or a computer infrastructure that performs one or more aspects of the technique for one or more customers. In return, the service provider may receive payment from the customer under a subscription and/or fee agreement, as examples. Additionally or alternatively, the service provider may receive payment from the sale of advertising content to one or more third parties.

In one aspect of the technique, an application may be deployed for performing one or more aspects of the technique. As one example, the deploying of an application comprises providing computer infrastructure operable to perform one or more aspects of the technique.

As a further aspect of the technique, a computing infrastructure may be deployed comprising integrating computer readable code into a computing system, in which the code in combination with the computing system is capable of performing one or more aspects of the technique.

As yet a further aspect of the technique, a process for integrating computing infrastructure comprising integrating computer readable code into a computer system may be provided. The computer system comprises a computer readable medium, in which the computer medium comprises one or more aspects of the technique. The code in combination with the computer system is capable of performing one or more aspects of the technique.

Further, other types of computing environments can benefit from one or more aspects of the technique. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the technique, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or steps plus function elements in the descriptions below, if any, are intended to include any structure, material, or act for performing the function in combination with other elements as specifically noted. The description of the technique has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular uses contemplated.

The invention claimed is:

1. A computer-implemented method comprising:
   obtaining, by one or more processors of a first controller in a distributed network comprised of network components, concurrently with a second controller in the distributed network, a system requirement and a message from a logical bus, wherein the first controller and the second controller are communicatively coupled to the logical bus, and wherein the first controller is communicatively coupled to a first portion of the network components and the second controller is communicatively coupled to a second portion of the network components;
   based on the message, solving, by the one or more processors of the first controller, concurrently with the second controller, the system requirement in a context of a current dynamic state of the network components, wherein the solving comprises applying a satisfiability modulo theories solver to generate new configurations of the network components, wherein the new configurations generated by the first controller are identical to the new configurations generated by the second controller, wherein the solving further comprises generating a reconfiguration order for configuring the network components with the new configurations, wherein following the reconfiguration order enables the first controller to maintain connectivity to the first portion of the network components when applying the new configurations, and wherein following the reconfiguration order enables the second controller to maintain connectivity to the second portion of the network components when applying the new configurations;
   extracting, by the one or more processors of the first controller, configurations relevant to the first portion of the network components from the new configurations generated by the first controller;
   extracting, by one or more processors of the second controller, configurations relevant to the second portion of the network components from the new configurations generated by the second controller, wherein the message causes the first controller and the second controller to wait a given interval before applying the configurations; and
   applying, after the given interval and utilizing the reconfiguration order, by the one or more processors of the first controller, the configurations relevant to the first portion of the network components to the first portion of the network components, wherein the applying comprises applying the configurations to the first portion of the network components concurrently with the second controller applying, after the given interval and utilizing the reconfiguration order, configurations relevant to the second portion of the network components to the second portion of the network components, and wherein based on utilizing the reconfiguration order in the applying, each network component of the network components comprising the distributed system is provided with a consistent view of an order of events in the distributed system.

2. The method of claim 1, further comprising:
   obtaining, by the one or more processors of the first controller, based on the applying the configurations relevant to the first portion of the network components to the first portion of the network components, current configuration and state information from the first portion of the network components.

3. The method of claim 1, wherein the solver is a deterministic solver.

4. The method of claim 2, wherein the obtaining current configuration and state information from the first portion of the network components comprises obtaining an equivalent sequence of random bits to the sequence of random bits obtained by the second controller.

5. The method of claim 1, further comprising:
   obtaining, by the one or more processors of the first controller, current configuration and state information from the first portion of the network components and at least one message from the logical bus; and
   converging, based on the applying the configurations to the first portion of the network components concurrently with the second controller applying configurations relevant to the second portion of the network components to the second portion of the network components, the network components to a configuration satisfying the system requirement.

6. The method of claim 1, wherein the solving comprises:
   computing, by the one or more processors of the first controller, a current dynamic state of all components as a constraint; and
   forming, by the one or more processors of the first controller, a conjunction of the constraint with the system requirement and solving the system requirement based on the conjunction.

7. The method of claim 1, further comprising:
   obtaining, by one or more processors of a first controller from the logical bus, a message indicating that the second controller is inoperable;
   extracting, by the one or more processors of the first controller, configurations relevant to the second portion of the network components; and
   applying, by the one or more processors of the first controller, the configurations to the second portion of the network components.

8. A computer program product comprising:
   a non-transitory computer readable storage medium readable by one or more processors and storing instructions for execution by the one or more processors for performing a method comprising:
   obtaining, by one or more processors of a first controller in a distributed network comprised of network components, concurrently with a second controller in the distributed network, a system requirement and a message from a logical bus, wherein the first controller and the second controller are communicatively coupled to the logical bus, and wherein the first controller is communicatively coupled to a first portion of the network components and the second controller is communicatively coupled to a second portion of the network components;
   based on the message, solving, by the one or more processors of the first controller, concurrently with the second controller, the system requirement in a context of a current dynamic state of the network components, wherein the solving comprises applying a satisfiability modulo theories solver to generate new configurations of the network components, wherein the new configurations generated by the first controller are identical to the new configurations generated by the second controller;

extracting, by the one or more processors of the first controller, configurations relevant to the first portion of the network components from the new configurations generated by the first controller;

extracting, by one or more processors of the second controller, configurations relevant to the second portion of the network components from the new configurations generated by the second controller, wherein the message causes the first controller and the second controller to wait a given interval before applying the configurations; and applying, after the given interval and utilizing the reconfiguration order, by the one or more processors of the first controller, the configurations relevant to the first portion of the network components to the first portion of the network components, wherein the applying comprises applying the configurations to the first portion of the network components concurrently with the second controller applying, after the given interval and utilizing the reconfiguration order, configurations relevant to the second portion of the network components to the second portion of the network components, and wherein based on utilizing the reconfiguration order in the applying, each network component of the network components comprising the distributed system is provided with a consistent view of an order of events in the distributed system.

9. The computer program product of claim 8, the method further comprising:
obtaining, by the one or more processors of the first controller, based on the applying the configurations relevant to the first portion of the network components to the first portion of the network components, current configuration and state information from the first portion of the network components.

10. The computer program product of claim 8, wherein the solver is a deterministic solver.

11. The computer program product of claim 9, wherein the obtaining current configuration and state information from the first portion of the network components comprises obtaining an equivalent sequence of random bits to the sequence of random bits obtained by the second controller.

12. The computer program product of claim 8 further comprising:
obtaining, by the one or more processors of the first controller, current configuration and state information from the first portion of the network components and at least one message from the logical bus; and converging, based on the applying the configurations to the first portion of the network components concurrently with the second controller applying configurations relevant to the second portion of the network components to the second portion of the network components, the network components to a configuration satisfying the system requirement.

13. The computer program product of claim 8, wherein the solving comprises:

computing, by the one or more processors of the first controller, a current dynamic state of all components as a constraint; and forming, by the one or more processors of the first controller, a conjunction of the constraint with the system requirement and solving the system requirement based on the conjunction.

14. A system comprising:
a memory;
one or more processors in a distributed network comprised of network components in communication with the memory, comprising one or more processors of a first controller and one or more processors of a second controller; and program instructions executable by the one or more processors via the memory to perform a method, the method comprising:
obtaining, by the one or more processors of the first controller, concurrently with a second controller in the distributed network, a system requirement and a message from a logical bus, wherein the first controller and the second controller are communicatively coupled to the logical bus, and wherein the first controller is communicatively coupled to a first portion of the network components and the second controller is communicatively coupled to a second portion of the network components;

based on the message, solving, by the one or more processors of the first controller, concurrently with the second controller, the system requirement in a context of a current dynamic state of the network components, wherein the solving comprises applying a satisfiability modulo theories solver to generate new configurations of the network components, wherein the new configurations generated by the first controller are identical to the new configurations generated by the second controller;

extracting, by the one or more processors of the first controller, configurations relevant to the first portion of the network components from the new configurations generated by the first controller;

extracting, by the one or more processors of the second controller, configurations relevant to the second portion of the network components from the new configurations generated by the second controller, wherein the message causes the first controller and the second controller to wait a given interval before applying the configurations; and applying, after the given interval and utilizing the reconfiguration order, by the one or more processors of the first controller, the configurations relevant to the first portion of the network components to the first portion of the network components, wherein the applying comprises applying the configurations to the first portion of the network components concurrently with the second controller applying, after the given interval and utilizing the reconfiguration order, configurations relevant to the second portion of the network components to the second portion of the network components, and wherein based on utilizing the reconfiguration order in the applying, each network component of the network components comprising the distributed system is provided with a consistent view of an order of events in the distributed system.

* * * * *